US012793205B2

(12) United States Patent
J et al.

(10) Patent No.: US 12,793,205 B2
(45) Date of Patent: Nov. 10, 2026

(54) VEHICLE CONTENT DISPLAY VERIFICATION

(71) Applicant: FCA US LLC, Auburn Hills, MI (US)

(72) Inventors: Joseph Antony J, Y-othakadia (IN); Sivapalan Balanayagam, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 197 days.

(21) Appl. No.: 18/664,427

(22) Filed: May 15, 2024

(65) Prior Publication Data

US 2025/0356477 A1 Nov. 20, 2025

(51) Int. Cl.

| | |
|---|---|
| ***G06T 7/00*** | (2017.01) |
| ***G06T 7/90*** | (2017.01) |
| ***G06T 11/00*** | (2026.01) |
| ***G06T 11/10*** | (2026.01) |

(52) U.S. Cl.

CPC ................ *G06T 7/001* (2013.01); *G06T 7/90* (2017.01); *G06T 11/10* (2026.01); *G06T 2207/30121* (2013.01)

(58) Field of Classification Search

CPC ....... G06T 11/001; G06T 11/10; G06T 7/001; G06T 7/90; G06T 2207/30121; G06T 2207/20224; G06T 2207/10016; G06V 20/588; G06V 20/584; G06V 10/147; B60R 1/04; B60R 2001/1223; B60R 2001/1253; B60R 2001/1215; B60R 2001/1284; G08G 1/166; B60W 30/14; B60W 30/12; G09G 5/02–10

See application file for complete search history.

(56) References Cited

U.S. PATENT DOCUMENTS

| | | | | |
|---|---|---|---|---|
| 9,230,183 | B2 * | 1/2016 | Bechtel | B60R 1/04 |
| 2011/0285982 | A1 * | 11/2011 | Breed | B60N 2/0025 356/614 |
| 2016/0023603 | A1 * | 1/2016 | Vico | B60R 11/04 348/148 |
| 2021/0295621 | A1 * | 9/2021 | Kang | G07C 5/008 |
| 2022/0092996 | A1 * | 3/2022 | Korngold | G06T 7/73 |
| 2024/0168465 | A1 * | 5/2024 | Scherzer | G06T 7/001 |

OTHER PUBLICATIONS

Antony, Joseph, et al.; Pattern Generation Based Instrument Cluster Virtual Valdiation; 2007 (4 pages).

* cited by examiner

*Primary Examiner* — Wesner Sajous

(74) *Attorney, Agent, or Firm* — Jeremy J. Klobucar

(57) ABSTRACT

A system for comparing updated content on a vehicle display to control content, includes a display, a processor, and memory coupled to the processor and including one or more programs. The one or more programs generate multiple generated images for presentation on a vehicle display, compare generated pixel data of each of the generated images to control pixel data of a corresponding control image that is provided for each generated image, determine if the generated pixel data is different than the control pixel data, and generate an output image including pixels having generated pixel data that is different than the control pixel data.

20 Claims, 5 Drawing Sheets

VEHICLE CONTENT DISPLAY VERIFICATION

FIELD

The present disclosure relates to systems and method for verifying the content of one or more vehicle displays.

BACKGROUND

Vehicle displays have become increasingly more complex with higher resolution screens, configurable displays and an increased amount of information to be communicated to users via the displays. Early on, instrument panels included analog gauges and various warning lights used to provide information to a driver. Now, the displays are LED or LCD type displays, the simulated gauges and other information presented can be customized as to content and location on the display by users, and more frequent software updates enable adjustments and improvements over time. With so many options for the displays, ensuring the accuracy of information displayed is more challenging and can take considerable amounts of time.

SUMMARY

In at least some implementations, a system for comparing updated content on a vehicle display to control content, includes a display, a processor, and memory coupled to the processor and including one or more programs. The one or more programs generate multiple generated images for presentation on a vehicle display, compare generated pixel data of each of the generated images to control pixel data of a corresponding control image that is provided for each generated image, determine if the generated pixel data is different than the control pixel data, and generate an output image including pixels having generated pixel data that is different than the control pixel data.

In at least some implementations, the output image does not include pixels of a generated image in which the generated pixel data is not different than the control pixel data.

In at least some implementations, the output image includes adjacent pixels having generated pixel data that is not different from the control pixel data, wherein the adjacent pixels are within an area that includes at least one pixel having generated pixel data that is different from the control pixel data.

In at least some implementations, the output image is generated when a difference between the generated pixel data varies from the control pixel data by more than a threshold amount in a region of the generated image. In at least some implementations, the threshold is exceeded when at least three percent of the pixels within one region in the generated image are different than the corresponding pixels in the control image.

In at least some implementations, the difference is determined if a color value for a pixel in the generated image differs from the color value for a corresponding pixel in the corresponding control image. In at least some implementations, each pixel is assigned a color code and wherein a color code threshold is set for a difference between the color code of a pixel in a generated image from the color code of a corresponding pixel in the corresponding control image. In at least some implementations, the output image is generated when at least a first threshold number of pixels in a region of one of the generated images have a color code that differs from the color code of the corresponding pixels in the corresponding control image.

In at least some implementations, the generated images convey information in one or more predetermined review areas and wherein the review areas are compared against corresponding areas in corresponding control images, and wherein other areas not within the review areas in one of the generated images are not compared to corresponding other areas of the corresponding control image so that only portions of the generated image are compared to the corresponding control image.

In at least some implementations, a pixel in which the generated pixel data is different than the pixel data of a corresponding area of the corresponding control image, the generated pixel data is compared to an intended pixel data indicative of an intended change, and the pixel is removed from the output image if the generated pixel data for that pixel is the same as or within a threshold of the intended pixel data.

In at least some implementations, a method of comparing updated content on a vehicle display to control content, includes:

- generating a generated image including content for presentation on a vehicle display;
- comparing generated pixel data of the generated image to control pixel data of a control image;
- determining if the generated pixel data is different than the control pixel data; and
- generating an output image that represents pixels in the generated image for which the generated pixel data is different than the control pixel data.

The systems and methods facilitate thorough review of many images which can be useful to verify the content of images generated after an update or review to software that generates the images. In a vehicle display, many different types of content may be selectively provided resulting in thousands of different combinations of content display images. When the programs that provide the content for display are revised or updated, verifying that the images display the intended content in the intended manner can be extremely time and resource consuming, and hence the process is costly and causes delays in implementing software revisions and updates, for example. Among other things, the systems and methods narrow the number of images that must be reviewed for verification, and the amount of each image that must be reviewed and provide particular information about differences in images that facilitates the review and verification.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
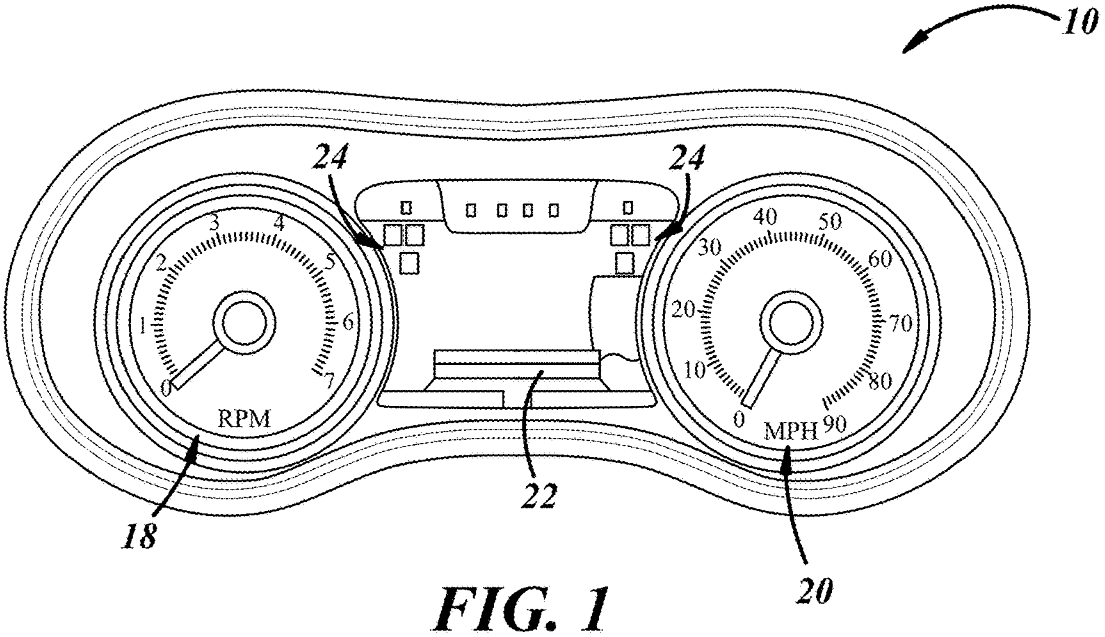
FIG. 1 is a front view of a display of an instrument panel of a vehicle.

Referring in more detail to the drawings, FIG. 1 illustrates a vehicle display 10 such as may be provided on an instrument panel of a vehicle. The display 10 may be a LED, OLED, LCD, TFT LCD or other suitable type, and may be one of many displays provided within a vehicle. The displays can be part of or communicated with a control system 12 (FIG. 2) that may include an infotainment system 14 (FIG. 2) that may include or permit control of audio and video systems, and a user interface 16 with suitable inputs, which may be provided via a touch responsive screen, provided with various menu options by which the user can control certain vehicle systems like HVAC, music, information displays, and certain vehicle/preference settings like suspension stiffness, driving mode (e.g. SPORT, ECO, TOUR, TRACK powertrain and/or suspension modes), interact with a connected remote device (e.g. mobile phone), and the like.

Figure 4:
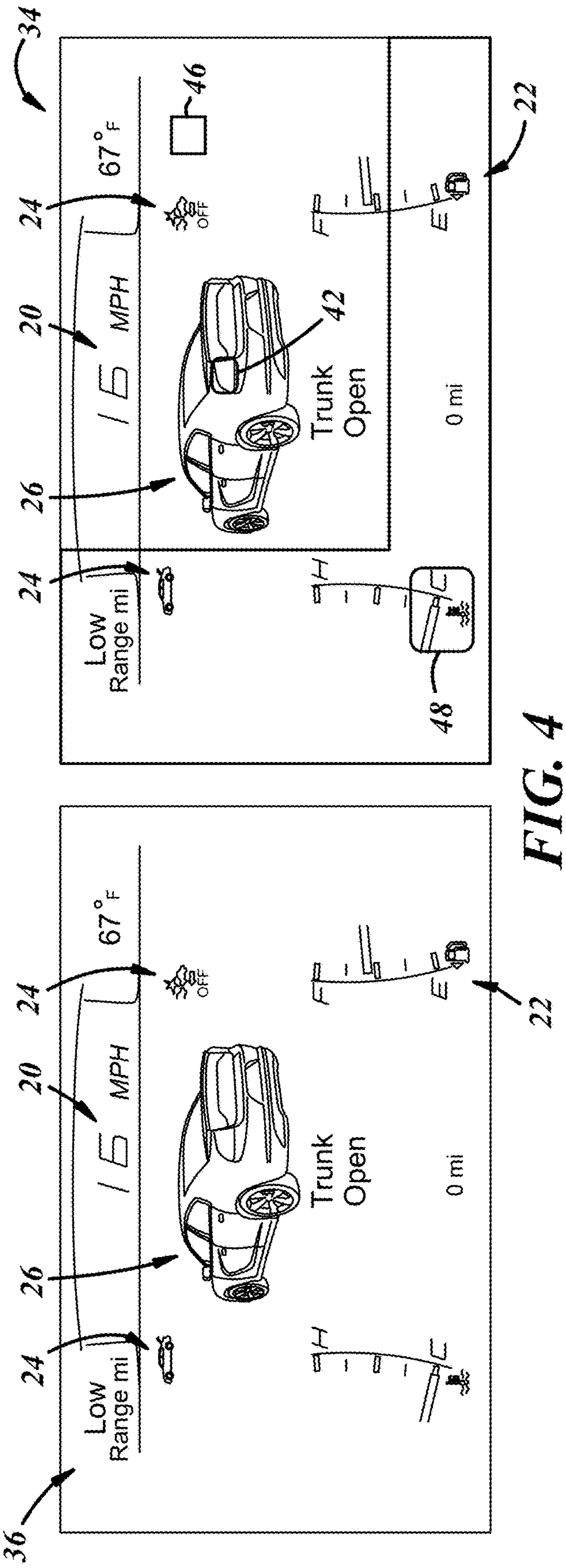
FIG. 4 is a view showing a control image and a generated image for a portion of the display, and overlaid image patterns of an output image generated by comparison of the two images.
Figure 5:
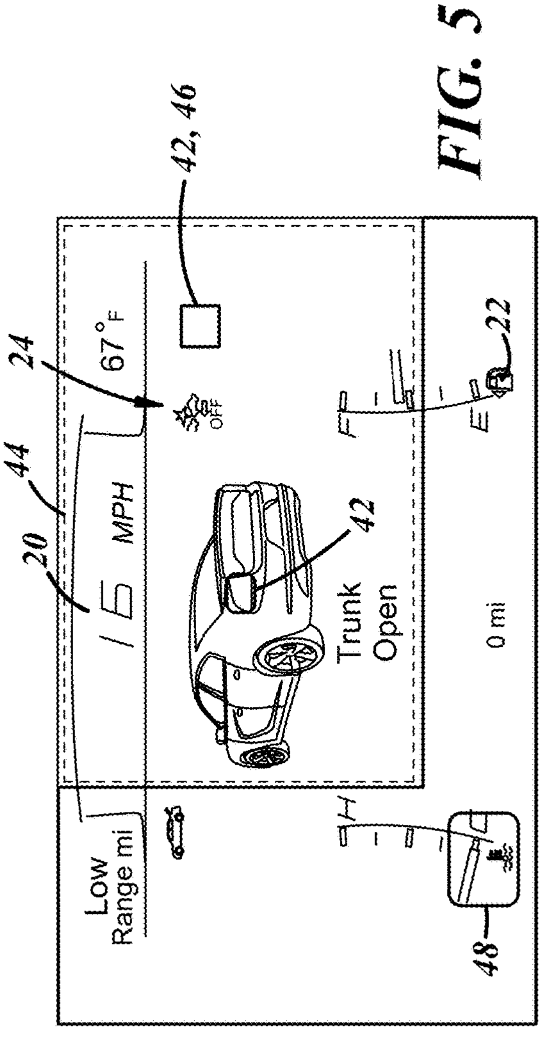
FIG. 5 is an enlarged view of the generated image with overlaid image patterns of the output image.

On the display 10 various content such as graphics (images, animations, video), text and other information may be provided simultaneously and at different times. Different content may appear together on different parts of the display, and different content may appear at different times on the same part of a display. For example, digital gauges or gauge information may be provided for various vehicle systems, like a gauge 18 for engine or motor speed (e.g. in RPMs), a gauge 20 for vehicle speed, a gauge or indicator 22 of fuel level, various other gauges may be provided for things like oil pressure, oil temperature, battery charge or voltage output level, coolant temperature, and the like. Other information may be provided on the display, like audio source information, HVAC settings, temperature(s), transmission settings, powertrain modes, whether the vehicle is in a 2-wheel, all-wheel or 4-wheel drive setting, and a current drive gear (PRNDL) that the vehicle is in. Alerts and warnings (e.g. check engine, low tire pressure, etc.) may appear as icons 24 in designated areas of the display. Additionally, as shown in FIGS. 4 and 5, some content for the display(s) 10 may include graphic representations 26 of the vehicle, perhaps showing the status of various systems like whether or not a door is open or closed, a window up or down, a light on or off, and the like.

In short, a lot of content can be selectively provided (e.g. provided when needed or chosen) via one or more vehicle screens/displays. Further, users can customize the layout or appearance of the displays and choose where at least certain information is displayed as well as, to some extent, the appearance of the information. The numbers of different combinations of layouts or appearances of content on the display becomes very high. For example, a difference between a first layout to a second layout could be only a change in the displayed vehicle speed (e.g. 15 mph in one image and 16 mph in another), where each displayed speed is another presentation or layout of a screen. Next, the different speeds may appear with various other displayed items changed, for example, different oil temperatures or oil pressures, from one layout to another layout. These are just a couple simple examples. Each iteration is a different image and each image provides a particular set of displayed information which may include images, text, animations (each frame of an animation or video may correspond to a different image as well), and the like.

Figure 2:
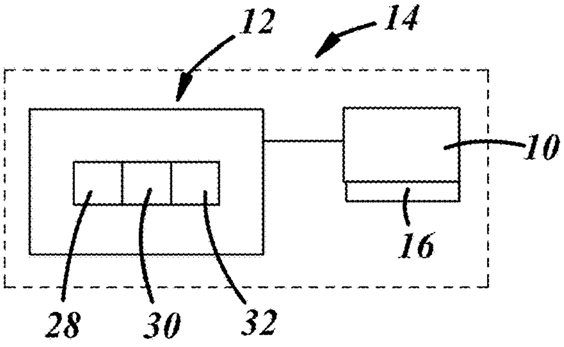
FIG. 2 is a diagrammatic view of a vehicle control system and display.

As shown in FIG. 2, the content to be displayed at any one time on the display 10 is provided to the display 10 by the vehicle control system 12. In order to perform the functions and desired processing set forth herein, as well as the computations therefore, the vehicle control system 12 may include, but is not limited to, one or more controller(s), processor(s), computer(s) (generally referred to at 28), DSP (s), memory 30, storage, register(s), timing, interrupt(s), communication interface(s), and input/output signal interfaces, and the like, as well as combinations comprising at least one of the foregoing. For example, the control system 12 may include input signal processing and filtering to enable accurate sampling and conversion or acquisitions of such signals from communications interfaces and sensors. As used herein the term control system 12 may refer to one or more processing circuits such as an application specific integrated circuit (ASIC), an electronic circuit, a processor (shared, dedicated, or group) and memory that executes one or more sets of instructions/software or firmware programs 32, a combinational logic circuit, and/or other suitable components that provide the described functionality. The control system 12 may be distributed among different vehicle modules, such as an infotainment control module, engine control module or unit, powertrain control module, transmission control module, and the like.

The term "memory" 30 or "storage" or the like, as used herein, can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory 30 can store an operating system and/or instructions executable by a processor 28 or controller or the like to enable control or allocate resources of a computing device. The instructions may be part of one or more software programs 32 or applications or other code, to provide the functions and options noted herein.

To ensure that the content is presented as intended on the display 10, the programs 32 can be made to cause the control system 12 to display all combinations of layouts to ensure that the information appears where and how intended, and to identify any errors or unintended display items. As shown in FIGS. 4 and 6, each layout is captured or contained within a generated image 34 and these generated images 34 can be compared to corresponding, previously generated control images 36, with differences identified between the images. In this process, there might be tens of thousands, or more, of combinations of information displays, and thus, a like number of newly generated images 34 and corresponding control images 36. When the program(s) that generate the images are updated, manually checking each area of each new generated image 34 against a corresponding control image 36 can be extremely time consuming, costly, resource consuming and challenging to do accurately.

Figure 6A:
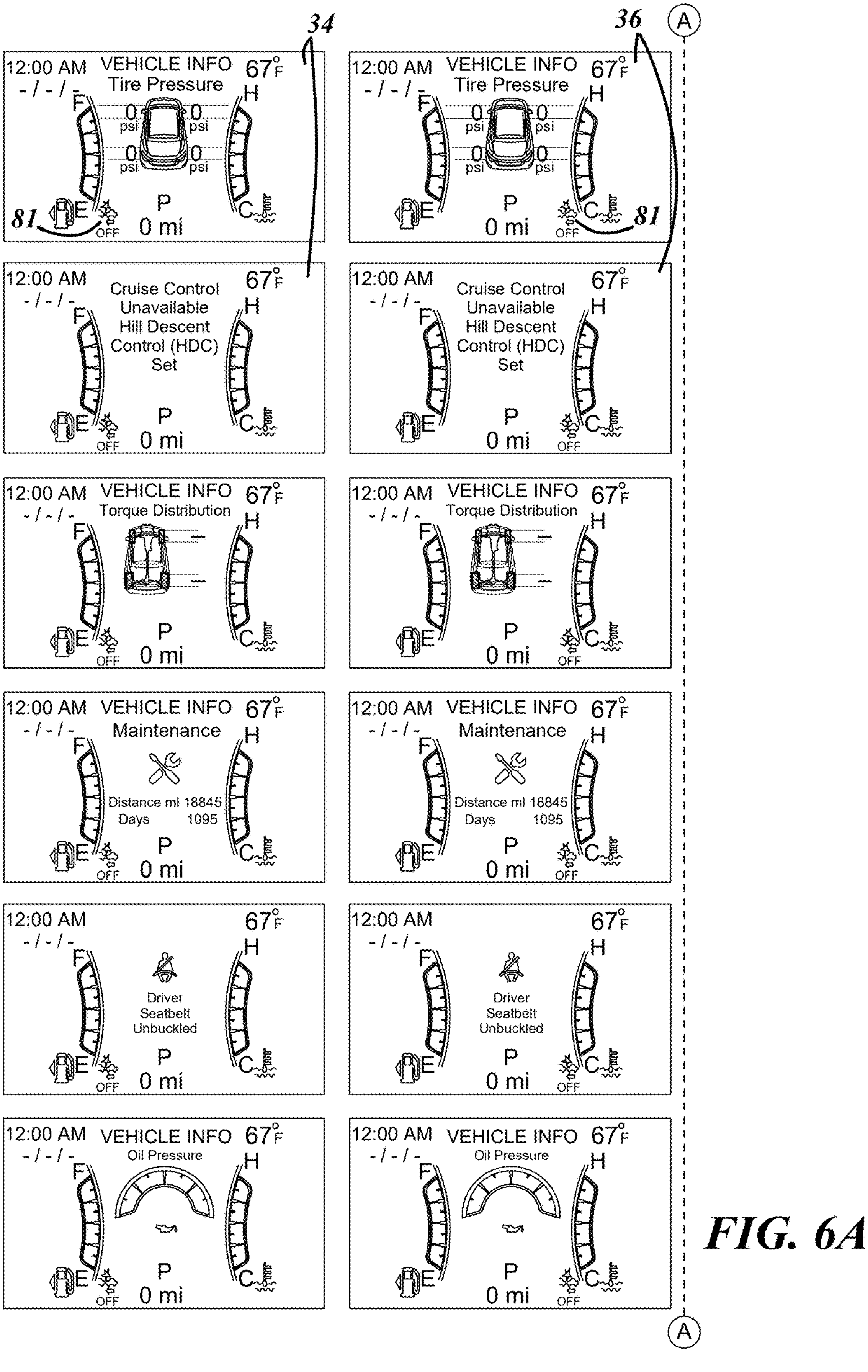
FIG. 6A is a view of multiple generated images and control images.
Figure 6B:
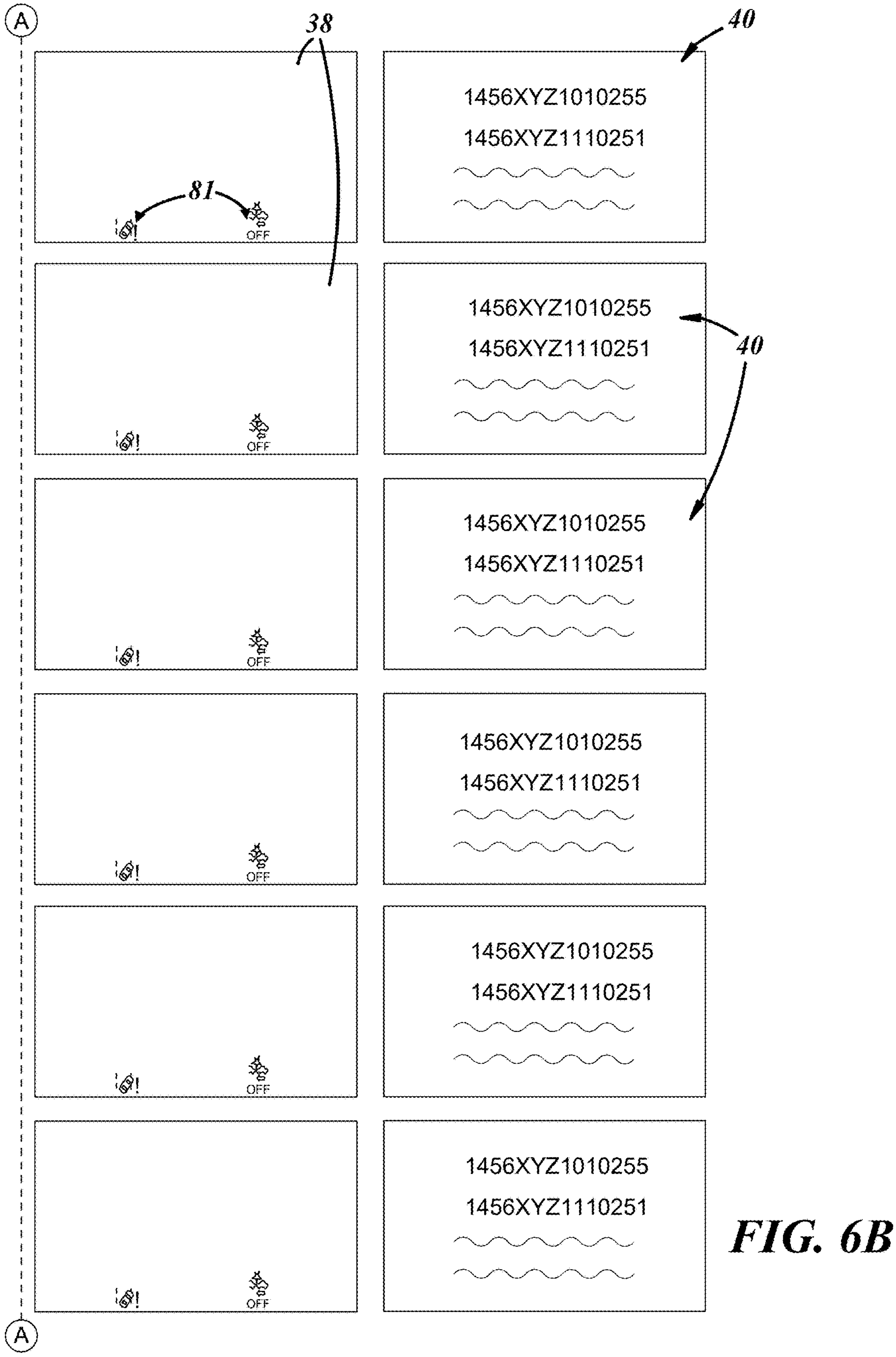
FIG. 6B is a view of multiple output images and generated codes that correspond to the images in FIG. 6A.

Often, during a software/program 32 update, only some of the information display content items are updated, perhaps moved to be shown on a different area of the display 10 or with a changed/new appearance, and other content is intended to remain the same as in the previous software version. In these instances, control images 36 from a previous software version can be checked against generated images 34 from the updated/new software version to identify differences between the images. The differences can then be checked to determine whether they match what was intended, or if they represent an error that needs to be corrected with a further software update. Accordingly, in at least some implementations, the systems and methods digitally compare each generated image 34 to a corresponding control image 36 and record or save an output image 38, as shown in FIGS. 6A and 6B, only in instances in which there is at least some difference between the two compared images 34, 36. In this way, the number of output images 38 that need to be reviewed is reduced by way of not having to review images in which no difference was detected by the system. In FIGS. 6A and 6B, the left column includes a series of generated images 34, the middle column includes the control images 36 each of which is associated with the generated image 34 immediately to the left, and the right column includes the resulting output images 38.

To enable further reduction of the output images 38 that are created, or to facilitate review of output images 38, the systems and methods may place or associate output images 38 in groups by the type of difference(s) detected, and may provide a code or identifier (ID) 40 for each difference detected. The ID 40 for a difference may be generated as a function of the location (e.g. particular pixel) of a difference as well as the type of difference (e.g. a difference in color of the pixel denoted in some predetermined manner). The IDs 40 may be a code, such as an alphanumeric code generated as a function of a predetermined algorithm so that the IDs 40 are consistent across all output images. In at least some implementations, the IDs 40 provide information about location and color for a pixel determined to be different in a generated image 34 compared to the corresponding control image 36. The color of a pixel may be noted in any desired manner, such as by its red, blue, green value each on a scale of 0 to 255, as is known, or by giving the possible colors a unique number, e.g. from 1 to 1000, or 1 to U.S. Pat. No. 16,777,216 (which may be convenient for 24-bit RBG pixels), or on any desired scale or range. The color for a different pixel could be indicated as one or more of: 1) the pixel color in the control image; 2) the pixel color in the generated image; and 3) a difference between the pixel colors of (1) and (2). Option (3) enables, for example, all different pixels having the same color difference relative to the control images to be grouped, to distinguish between different pixels having different colors in the output images. The code could be a binary code or of any other desired type.

In this way, output images 38 that include differences having the same IDs 40 need not be separately reviewed (e.g. only one output image 38 needs to be reviewed among a group of output images 38 having the same ID 40) as it can be known from the IDs 40 that the differences are the same in multiple output images. In this way, once a difference having a particular ID 40 is reviewed, all output images 38 having that ID 40 are effectively reviewed with respect to that difference.

Each difference may be given an ID 40, and because a generated image 34 may have multiple differences from its corresponding control image 36, an output image 38 may then have multiple, separate IDs 40, in at least some implementations. In this way, the output image 38 may be put in or associated with multiple groups where each group has a difference with the same ID 40. Such output images 38 may be in two or more groups, with the differences in common groups only needing to being reviewed once to determine if the difference is an intended change or unintended change (e.g. fault or error). In this way, the differences can be reviewed by ID 40 rather than by image, enabling a greater reduction in the time, resources and cost to review the generated images for a software revision.

Still further, one or more thresholds may be provided to enable some image differences to be approved even though the pixels in a generated image 34 are not exactly as intended or not exactly as in the corresponding control image 36. By way of non-limiting examples, a threshold for color may be provided wherein a certain difference in color is deemed acceptable and/or does not require separate review. In this way, IDs 40 that are within a color threshold of each other may be grouped together and not separately reviewed, as desired, or an ID 40 might not be considered significant enough to cause an output image 38 to be generated so that no further review of the difference is undertaken. For example, with numerous numbers or codes for different colors, a small difference in color might not be noticeable to a user and not worthy of individual review in one part of a generated image but might be more important in another part of the image. In this way, one or more color thresholds, permitting varying magnitudes of color differences from the control image, may be determined and used in reviewing the generated images 34.

Similarly, the location of the pixels having a particular color (exact, or within a threshold) might be more important in certain areas of the generated image 34 than in other areas of the image. So different pixel location thresholds may be used, as desired. Still further, a threshold can be set for the number of pixels that have differences within a predetermined region of an image that may be of interest in a software revision, or an area 42 (FIG. 5) of a predetermined size. In at least some implementations, the threshold is exceeded when at least 3% of the pixels within one region in the generated image are different than the corresponding pixels in the control image. In at least some implementations, if the number of different pixels in an area 42 is below the corresponding threshold, then an output image 38 is not generated, or the output image 38 is generated and the differences are given a lower priority for review (up to a priority level in which no review is needed).

In at least some implementations, the intended changes in a software revision may be known and codes/IDs 40 associated with the intended changes. In this way, output images 38 can be sorted to remove differences that are the same as the intended changes (with or without permitting differences within one or more thresholds, as desired). Or, the program (s) 32 may not generate output images 38 or may delete or ignore generated output images 38 that have only differences that are the same as the intended changes (again, either exactly or within one or more thresholds, as desired). For example, intended changes may include shifting or one or more icons or other content from one portion of the display 10 to another, and the system can be set to determine if the pixels have been shifted as intended, and to generate an output image 38 if not. This information can be provided in the form of known offsets for the location of such content, or by reviewing the IDs 40 of differences identified in the generated image to a data set of intended IDs 40. In the latter example, movement of an icon would cause differences to be noted both where the icon used to be located and where it is now located, and IDs 40 for the affected pixels can be predetermined and used in the comparison to ensure the changes occurred as intended.

In at least some implementations, all pixels of a generated image 34 need not be reviewed against the pixels of the corresponding control image 36. Instead, as indicated in FIGS. 4 and 5, one or more review areas 44, one of which is denoted by dashed line polygon, may be predetermined and the pixels within the one or more review areas 44 can be compared to the corresponding pixels in the corresponding area of the corresponding control image 34, and optionally against data or IDs 40 indicative of intended differences. Other portions of the generated image 34 that are not within the review area 44 are not checked against the control image 36, in at least some implementations. This reduces the number of pixels that are reviewed, and can reduce resources and time to conduct the image reviews. This may be done, for example, when the changes to the program(s) 32 are known to provide generated images 34 with changes only in certain portions of the display, or when changes in areas outboard of the review area(s) 44 are not pertinent (e.g. such changes may be within a review area 44 determined for a different generated image and may be compared for that different generated image but need not be compared for all generated images in a subset of generated images 34).

In FIGS. 4 and 5, a first polygon 46 shows an area 42 within the review area 44 of the generated image 34 in which one or more pixels are different than the control image 36, and the area in this first polygon is represented in an output image 38. A second polygon 48 shows an area in which one or more pixels are different than the control image 36 but that is not within the review area 44 and so is not represented in an output image 38, at least not with respect to this particular generated image 34.

Figure 3:
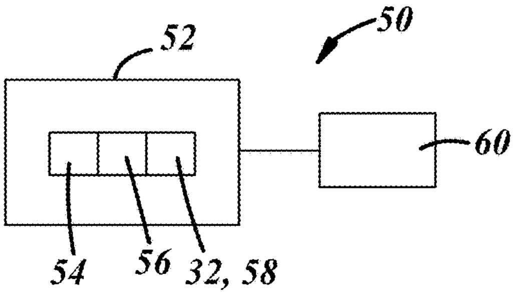
FIG. 3 is a diagrammatic view of an external control system.

During testing of the content to be displayed, the systems and methods may use an external control system 50, as diagrammatically shown in FIG. 3, that is not part of the vehicle control system 12 and is remotely located from a vehicle. The external control system 50 may be or include one or more computers 52, and may have one or more processors 54, memory 56 in one or more components, and one or more programs 58 or applications or other code, as well as a display 60 that can present the images provided from the program(s) 58. The external control system 50 may be set up to mimic the operation of the vehicle control system 12, and to provide display output/layouts that are the same as or similar to what is provided in a vehicle. The external control system 50 may also execute the same programs 32 to provide the generated images 34 and the control images 36, and other programs 58 to compare generated images 34 to control images 36, including, for example, determination of IDs 40, generation of output images 38, categorizing or grouping output images 38, and similar steps and outputs to the extent such steps and outputs are part of an implementation being used.

Figure 7:
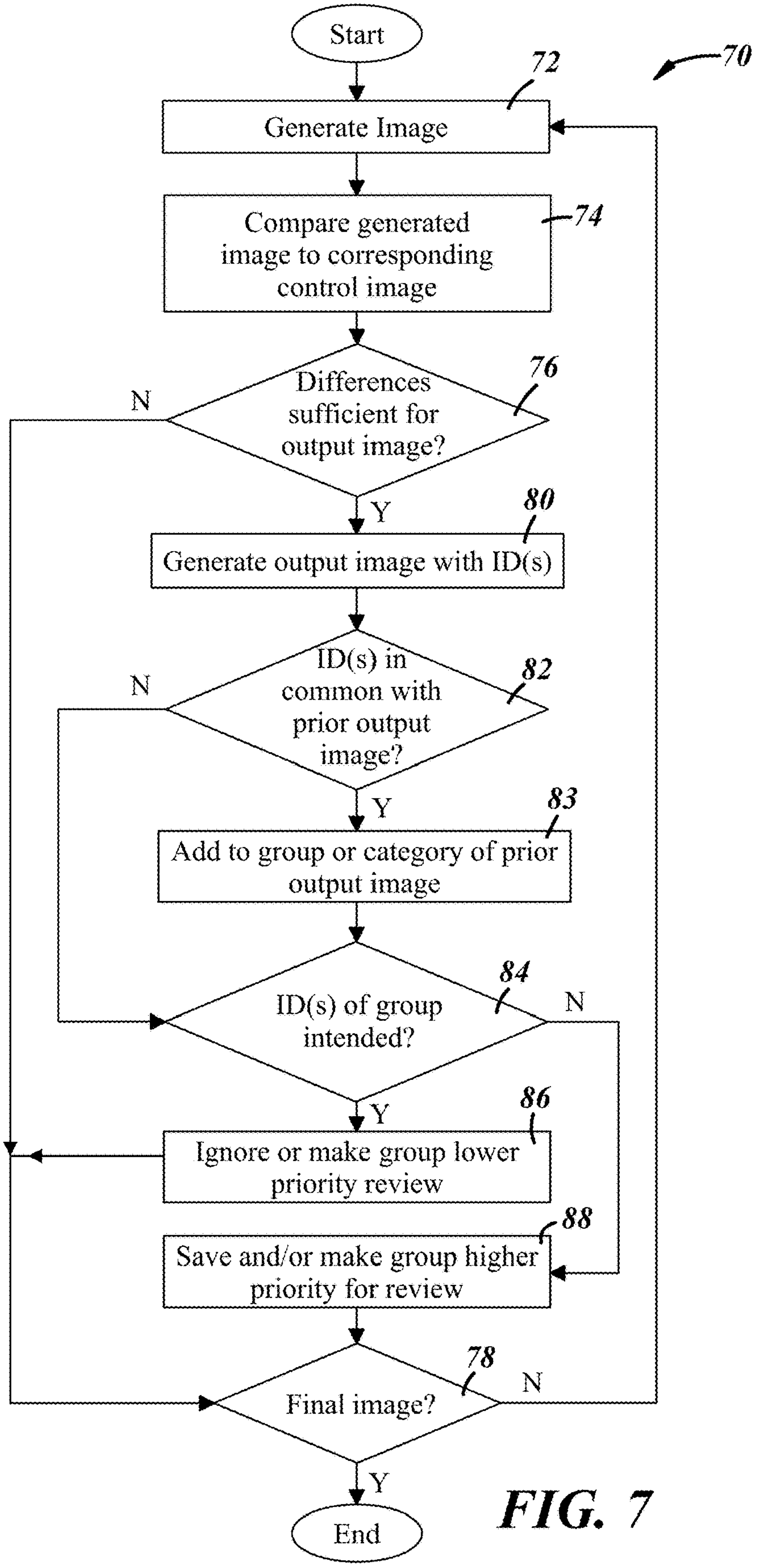
FIG. 7 is a flowchart of a method for comparing generated images against control images and generating output images.

FIG. 7 illustrates a method 70 for generating images, checking the generated images 34 against corresponding control images 36, and providing output images 38 or other output representative of at least the differences between the generated and control images 34, 36. In step 72, the processor(s) execute the new program(s) to cause a generated image 34 to be created according to the new programs 32. In step 74, pixel data of the generated image 34 is compared to pixel data of a corresponding control image 36 produced from the prior version of the program(s) 32. In step 76, it is determined if there are differences between the generated pixel data in the generated image 34 and the control pixel data in the control image 36 that are sufficient to cause an output image 38 to be generated. The difference threshold could be zero or otherwise, including the types of thresholds noted herein. If there are no differences sufficient to cause generation of an output image 38, then the method proceeds to step 78 in which it is determined if the generated image 34 is the final image to be generated, and if so, the method ends. If not, then the method returns to step 72 for generation of a subsequent image.

If in step 76 it is determined that an output image 38 is to be generated, then the method proceeds to step 80 in which an output image 38 is generated, as is an ID 40 for each difference detected (or for differences greater than one or more thresholds). As shown in FIG. 6B, the output images 38 may include only the pixels of interest, or they may include some additional pixels in the area of and surrounding or adjacent to the pixels of interest to provide context for the area in which the different pixel(s) is/are located. The location of the pixels in the output image 38 may correspond to the location of the pixels in one or both of the generated image 34 and control image 36. If desired, each pixel in the output image 38, or each pixel that is different from the control image 36 or intended difference data, may be given an ID 40 indicative of the pixel parameters. In the example of FIG. 6A, the difference in each generated image 34 relative to its corresponding control image 36 is a change in the location of an icon 81 which moved to the lower left side in the generated image 34 and was in the lower right side of the control image 36. Both locations may be shown in the output image, and for ease of comparison the differences may include indicia (e.g. circled or called out in different colors, or with text, etc) to indicate which is based on the generated image 34 and which on the control image 36.

For at least the different pixels within an output image 38, in this implementation, the IDs 40 are compared in step 82 to IDs 40 generated in prior output images 38. If so, the current output image 38 is, in step 83, grouped or categorized together with such prior output images 38, and if not the output image 38 may be further processed. For example, in step 84, the IDs 40 of the pixels can be compared to data including the intended changes to pixels, and if the changes were intended, the output image 38 can, in step 86, be deleted or ignored, or designated as a lower priority for further review. If in step 84, the pixel differences are determined to not have been intended, then in step 88 the output image 38 can be saved and can be given a higher priority for further review. The method may then proceed to step 78 to determine if the generated image 34 is the final image or not, and then end or loop back to step 72 for review of another generated image 34.

Accordingly, the systems and method enable efficient comparison of a large number of vehicle display images such as may be needed after one or more programs that cause content to be displayed is updated or otherwise altered. The images generated by new programs can be reviewed in their entirety, or only portions might be reviewed and then only the pixels of interest after a comparison can be provided in an output image for easy manual review. Pixels in common with a control image or control data set need not be provided in an output image as they need not be reviewed, or a nominal amount of pixels can be provided around a pixel having an unintended difference to provide context for the different pixel. The systems and methods enable most of the comparisons to be done automatically, and differences to be compared against data/IDs of intended changes to obviate the need to review differences in generated images that are intended and already approved. These and other features can dramatically reduce the number of images and the portions of such images that require manual review and interpretation, and can dramatically reduce the human and computer resources, time and cost to validate programs that provide content for display in a vehicle.

What is claimed is:

1. A system for comparing updated content on a vehicle display to control content, comprising:
- a display;
- a processor; and
- memory coupled to the processor and including one or more programs that:
- generate multiple generated images for presentation on a vehicle display, wherein the generated images include software generated graphic icons and text;
- compare generated pixel data of each of the generated images to control pixel data of a corresponding control image that is provided for each generated image, wherein the control images include software generated graphic icons and text;
- determine if the generated pixel data is different than the control pixel data; and
- generate an output image including pixels having generated pixel data that is different than the control pixel data.

2. The system of claim 1 wherein the output image does not include pixels of a generated image in which the generated pixel data is not different than the control pixel data.

3. A system for comparing updated content on a vehicle display to control content, comprising:
- a display;
- a processor; and
- memory coupled to the processor and including one or more programs that:
- generate multiple generated images for presentation on a vehicle display;
- compare generated pixel data of each of the generated images to control pixel data of a corresponding control image that is provided for each generated image;
- determine if the generated pixel data is different than the control pixel data; and
- generate an output image including pixels having generated pixel data that is different than the control pixel data, wherein the output image includes adjacent pixels having generated pixel data that is not different from the control pixel data, wherein the adjacent pixels are within an area that includes at least one pixel having generated pixel data that is different from the control pixel data.

4. The system of claim 1 in which the output image is generated when a difference between the generated pixel data varies from the control pixel data by more than a threshold amount in a region of the generated image.

5. The system of claim 4 wherein the threshold is exceeded when at least three percent of pixels within one region in the generated image are different than the corresponding pixels in the control image.

6. The system of claim 2 in which the output image is generated when a difference between the generated pixel data varies from the control pixel data by more than a threshold amount in a region of the generated image.

7. The system of claim 6 wherein the threshold is exceeded when at least three percent of pixels within one region in the generated image are different than the corresponding pixels in the control image.

8. The system of claim 1 wherein the difference is determined if a color value for a pixel in the generated image differs from the color value for a corresponding pixel in the corresponding control image.

9. The system of claim 8 wherein each pixel is assigned a color code and wherein a color code threshold is set for a difference between the color code of a pixel in a generated image from the color code of a corresponding pixel in the corresponding control image.

10. The system of claim 9 wherein the output image is generated when at least a first threshold number of pixels in a region of one of the generated images have a color code that differs from the color code of the corresponding pixels in the corresponding control image.

11. The system of claim 1 wherein the generated images convey information in one or more predetermined review areas and wherein the review areas are compared against corresponding areas in corresponding control images, and wherein other areas not within the review areas in one of the generated images are not compared to corresponding other areas of the corresponding control image so that only portions of the generated image are compared to the corresponding control image.

12. The system of claim 1 wherein, for a pixel in which the generated pixel data is different than the pixel data of a corresponding area of the corresponding control image, the generated pixel data is compared to an intended pixel data indicative of an intended change, and the pixel is removed from the output image if the generated pixel data for that pixel is the same as or within a threshold of the intended pixel data.

13. A method of comparing updated content on a vehicle display to control content, comprising:
- generating with first software a generated image including content for presentation on a vehicle display;
- comparing generated pixel data of the generated image to control pixel data of a control image generated with second software;
- determining if the generated pixel data is different than the control pixel data; and
- generating an output image that represents pixels in the generated image for which the generated pixel data is different than the control pixel data.

14. The method of claim 13 wherein the output image does not include areas of a generated image in which the generated pixel data is not different than the control pixel data.

15. The method of claim 13 in which the output image is generated when a difference between the generated pixel data varies from the control pixel data by more than a threshold amount in a region of the generated image.

16. The method of claim 15 wherein the threshold is exceeded when at least three percent of the pixels within one region in the generated image are different than the corresponding pixels in the control image.

17. The method of claim 13 wherein the difference is determined if a color value for a pixel in the generated image differs from the color value for a corresponding pixel in the corresponding control image.

18. The method of claim 17 wherein each pixel is assigned a color code and wherein a color code threshold is set for a difference between the color code of a pixel in a generated image from the color code of a corresponding pixel in the corresponding control image.

19. The method of claim 13 wherein the generated images convey information in one or more predetermined review areas and wherein the review areas are compared against corresponding areas in corresponding control images, and wherein other areas not within the review areas in one of the generated images are not compared to corresponding other areas of the corresponding control image so that only portions of the generated image are compared to the corresponding control image.

20. The method of claim 13 wherein, for a pixel in which the generated pixel data is different than the pixel data of a corresponding area of the corresponding control image, the generated pixel data is compared to an intended pixel data indicative of an intended change, and the pixel is removed from the output image if the generated pixel data for that pixel is the same as or within a threshold of the intended pixel data.

* * * * *